US010190682B2

(12) United States Patent
Paisley et al.

(10) Patent No.: US 10,190,682 B2
(45) Date of Patent: Jan. 29, 2019

(54) ACTUATOR PROVIDED WITH A GEAR BOX, POSITION INDICATOR FOR A GEAR BOX, AND RELATED METHODS

(71) Applicant: Parker-Hannifin Corporation, Cleveland, OH (US)

(72) Inventors: Daniel Paisley, Lexington, KY (US); Bruce Fishburn, Memphis, TN (US)

(73) Assignee: Parker-Hannifin Corporation, Cleveland, OH (US)

( * ) Notice: Subject to any disclaimer, the term of this patent is extended or adjusted under 35 U.S.C. 154(b) by 414 days.

(21) Appl. No.: 14/895,092

(22) PCT Filed: Jun. 19, 2013

(86) PCT No.: PCT/US2013/046548
§ 371 (c)(1),
(2) Date: Dec. 1, 2015

(87) PCT Pub. No.: WO2014/204451
PCT Pub. Date: Dec. 24, 2014

(65) Prior Publication Data
US 2016/0131251 A1 May 12, 2016

(51) Int. Cl.
*E21B 33/06* (2006.01)
*F16H 61/28* (2006.01)
(Continued)

(52) U.S. Cl.
CPC ......... *F16H 61/2807* (2013.01); *E21B 33/06* (2013.01); *E21B 33/062* (2013.01);
(Continued)

(58) Field of Classification Search
CPC combination set(s) only.
See application file for complete search history.

(56) References Cited

U.S. PATENT DOCUMENTS 5,505,426 A 4/1996 Whitby et al.
2002/0117234 A1 8/2002 Brazell et al.
(Continued)

OTHER PUBLICATIONS

International Search Report, Application No. PCT/US2013/046548, dated May 27, 2014.

*Primary Examiner* — D. Andrews
*Assistant Examiner* — Ronald R Runyan
(74) *Attorney, Agent, or Firm* — MacMillan, Sobanski & Todd, LLC (57) ABSTRACT

An actuator system and method (10) includes a blow out preventer (11), a hydraulic motor (12), a gear box (13) intermediate hydraulic motor (12) and blow out preventer (11), and a position indicator (14). Gear box (13) has an input (19), an output (20), and a gear set (23). Gear set (23) is biased by a spring (33) acting on a piston (31) to a default high range gear ratio when blow out preventer (11) is open, to provide maximum closure/lock speed. Gear set (23) is moved by a hydraulic command signal acting on piston (31) to a low range gear ratio when blow out preventer (11) is closed/locked, to provide maximum torque to move blow out preventer (11) toward its open position. Position indicator (14) shows the actual position of blow out preventer (11) independent of the number of turns of input (19) to move the blow out preventer.

22 Claims, 7 Drawing Sheets (51) Int. Cl.
  *F16H 1/46* (2006.01)
  *F16H 3/091* (2006.01)
  *F16H 3/48* (2006.01)
  *F16H 37/04* (2006.01)
  *F16H 61/30* (2006.01)

(52) U.S. Cl.
  CPC ............... *F16H 1/46* (2013.01); *F16H 3/091* (2013.01); *F16H 3/48* (2013.01); *F16H 37/04* (2013.01); *F16H 61/30* (2013.01)

(56) References Cited

U.S. PATENT DOCUMENTS

| | | | |
|---|---|---|---|
| 2008/0210337 A1* | 9/2008 | Sommerville | B27C 5/02 144/135.2 |
| 2009/0091199 A1 | 4/2009 | Lee | |
| 2014/0069531 A1* | 3/2014 | Jaffrey | E21B 33/076 137/553 |

* cited by examiner

ACTUATOR PROVIDED WITH A GEAR BOX, POSITION INDICATOR FOR A GEAR BOX, AND RELATED METHODS

CROSS-REFERENCE TO RELATED APPLICATIONS

This application is the National Phase of International Application PCT/US2013/046548 filed Jun. 19, 2013, which designated the U.S. That International Application was published in English under PCT Article 21(2) on Dec. 24, 2014 as International Publication Number WO 2014/204451A1. The disclosure of that application is incorporated herein by reference.

TECHNICAL FIELD

This invention relates to actuators and actuator systems and to actuator methods. More specifically, this invention relates to actuators and systems for well bore blow out preventers. Still more specifically, this invention relates to a multi-speed shiftable actuator, to an actuator having a position indicator, and to a position indicator.

BACKGROUND OF THE INVENTION

Blow out preventers are used in hydrocarbon drilling and production operations as a device that closes, isolates, and seals the well bore. Blow out preventers are essentially large valves that are connected to the wellhead and comprise closure members capable of sealing and closing the well in order to prevent the release of high-pressure gas or liquids from the well. One type of blow out preventer used extensively in both low and high-pressure applications is a ram-type blow out preventer. A ram-type blow out preventer uses two opposed closure members, or rams, disposed within a specially designed housing, or body. The blow out preventer body has a bore that is aligned with the well bore. Opposed cavities intersect the bore and support the rams as they move into and out of the bore. A bonnet is connected to the body on the outer end of each cavity and supports an operator system that provides the force required to move the rams into and out of the bore.

The rams are equipped with sealing members that engage to prohibit flow through the bore when the rams are closed. The rams may be pipe rams, which are configured to close and seal an annulus around a pipe that is disposed within the bore, or may be blind rams or shearing blind rams, which are configured to close and seal the entire bore. A particular drilling application may require a variety of pipe rams and blind rams. Therefore, in many applications multiple blow out preventers are assembled into blow out preventer stacks that comprise a plurality of ram-type blow out preventers, each equipped with a specific type of ram for actuating the blow out preventer.

Ram-type blow out preventers are often configured to be operated using pressurized hydraulic fluid to control the position of the closure members relative to the bore. Although some blow out preventers are coupled to a fluid pump or some other active source of pressurized hydraulic fluid, some applications require a certain volume of pressurized hydraulic fluid to be stored and immediately available to operate the blow out preventer in the case of emergency. For example, some subsea operating specifications may require a blow out preventer stack to be able to cycle (i.e., move or actuate a closure member between the extended and retracted position) several times using only pressurized fluid stored on the stack assembly. In high-pressure, large blow out preventer stack assemblies, large volumes of pressurized fluid may have to be stored on the stack, creating both size and weight issues with the system. Because many subsea drilling applications require the use of large diameter, high pressure blow out preventers, the height, weight, and hydraulic fluid requirements of these blow out preventers, including their actuators, is limited and presents a technical problem in the design of the blow out preventers and of the drilling rigs that operate them. Additional technical problems with respect to actuators for blow out preventers include high torque or force requirements in limited space and ability to know if the actuator has performed its commanded actuation.

SUMMARY OF THE INVENTION

The present invention address these and other technical problems by providing in one embodiment an actuator system having a driven rotary device such as a well bore blow out preventer, a primary driver such as a hydraulic motor, and a gear box intermediate the primary driver and the driven rotary device. The gear box may have a gear box input connected to the primary driver output and may have a gear box output connected to the driven rotary device input. The gear box may have a gear set intermediate the gear box input and the gear box output. The gear set may have a high range gear ratio for transmitting a relatively higher speed and relatively lower torque from the gear box input to the gear box output and may have a low range gear ratio substantially lower than the high range gear ratio for transmitting a relatively lower speed and relatively higher torque from the gear box input to the gear box output.

A shift mechanism for the gear set may have a first configuration disengaging the low range gear ratio and engaging the high range gear ratio, and may have a second configuration engaging the low range gear ratio and disengaging the high range gear ratio. The shift mechanism may be biased to the first configuration as a default position, and the shift mechanism may move from the first configuration to the second configuration in response to a command signal. A mechanical spring may bias the shift mechanism to the first configuration as a default position. The shift mechanism may include a hydraulic piston to move the shift mechanism against the bias of the spring from the first configuration to the second configuration, and the hydraulic piston may be actuated by a pilot hydraulic command signal from outside the gear box.

The gear set in one embodiment may include a countershaft assembly, and the shift mechanism may include a clutch that disengages the countershaft assembly in the first configuration and engages the countershaft assembly in the second configuration. The gear box input may include an external input drive gear, and the gear box output may include an external output drive gear. The clutch may include an internal gear, and the internal gear may engage the external input drive gear in both the first and second configurations. The internal gear may engage the external output drive gear in the first configuration, and may disengage the external output drive gear in the second configuration. The countershaft assembly may include an external countershaft drive gear that drivingly engages the countershaft assembly under all conditions, and the internal gear may engage the external countershaft drive gear in the second configuration and disengage the external countershaft drive gear in the first configuration. The input drive gear may be intermediate the output drive gear and the countershaft drive gear, and the countershaft drive gear may be rotatably carried on the gear box input. The countershaft assembly may include a first countershaft gear drivingly engaging the countershaft drive gear under all conditions and a second countershaft drive gear drivingly engaging the output under all conditions.

The gear set in another embodiment may include a planetary gear set having a ring gear, a planet gear, and a planet gear carrier, and a clutch may drivingly engage the ring gear to the gear box input when the shift mechanism is in one configuration and may drivingly disengage the ring gear from the gear box input when the shift mechanism is in another configuration.

The driven rotary device in one embodiment may be a well bore blow out preventer. The blow out preventer may have a first position and a second position, and the gear set may be in the high gear range when the blow out preventer is being rotated from its first position to its second position. The gear set may be in the low gear range when the blow out preventer is initially being rotated from its second position toward its first position. The primary driver may be a bi-directional hydraulic motor, whereby the gear box input is rotated multiple rotations in either direction.

The invention in one embodiment may include a position indicator. The position indicator may include an indicator input, an indicator output, an indicator gear reducer, and an indicator attached to the indicator output. The indicator input may be drivingly connected to the driven rotary device input. The indicator input may be drivingly connected to the driven rotary device input through the gear box gear set. The indicator gear reducer may include first and second planetary gear sets in series coaxial arrangement.

The invention in one embodiment may provide a method of rotating a well bore blow out preventer input between a first position and a second position. The method may include connecting a primary driver through a gear box to the blow out preventer input, spring biasing the gear box to a one-to-one default gear ratio and rotating the primary driver in one direction to rotate the blow out preventer input from its first toward its second position. The method may further include communicating a hydraulic pressure command signal to the gear box to shift the gear box against the spring bias from its one-to-one default gear ratio to a lower gear ratio, and simultaneously maintaining the hydraulic pressure command signal to maintain the gear box in its lower gear ratio and rotating the primary driver in an opposite direction to rotate the blow out preventer input from its second position toward its first position.

These and additional features of the invention are more fully described and particularly pointed out in the description and claims set out below, and this summary is not intended to identify key features or essential features of the claimed subject matter. The following description and claims and the annexed drawings set forth in detail certain illustrative embodiments of the invention, and these embodiments indicate but a few of the various ways in which the principles of the invention may be used. The claims set out below are incorporated by reference in this summary.

BRIEF DESCRIPTION OF THE DRAWINGS

Embodiments of this invention will now be described in further detail with reference to the accompanying drawings, in which.

DETAILED DESCRIPTION OF THE DRAWINGS

Figure 1:
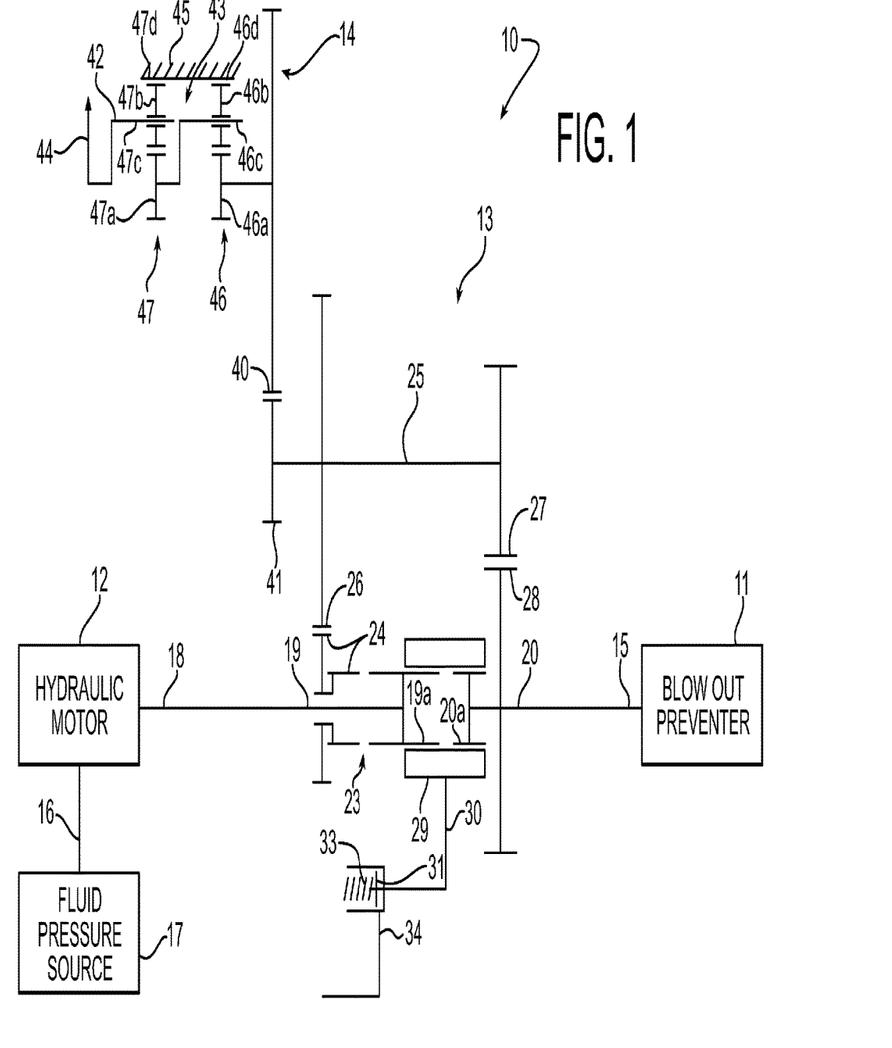
FIG. 1 is a schematic diagram of a system and method having a blow out preventer, blow out preventer actuator, and blow out preventer position indicator according to a preferred embodiment of the present invention, showing the blow out preventer actuator in a first configuration.
Figure 2:
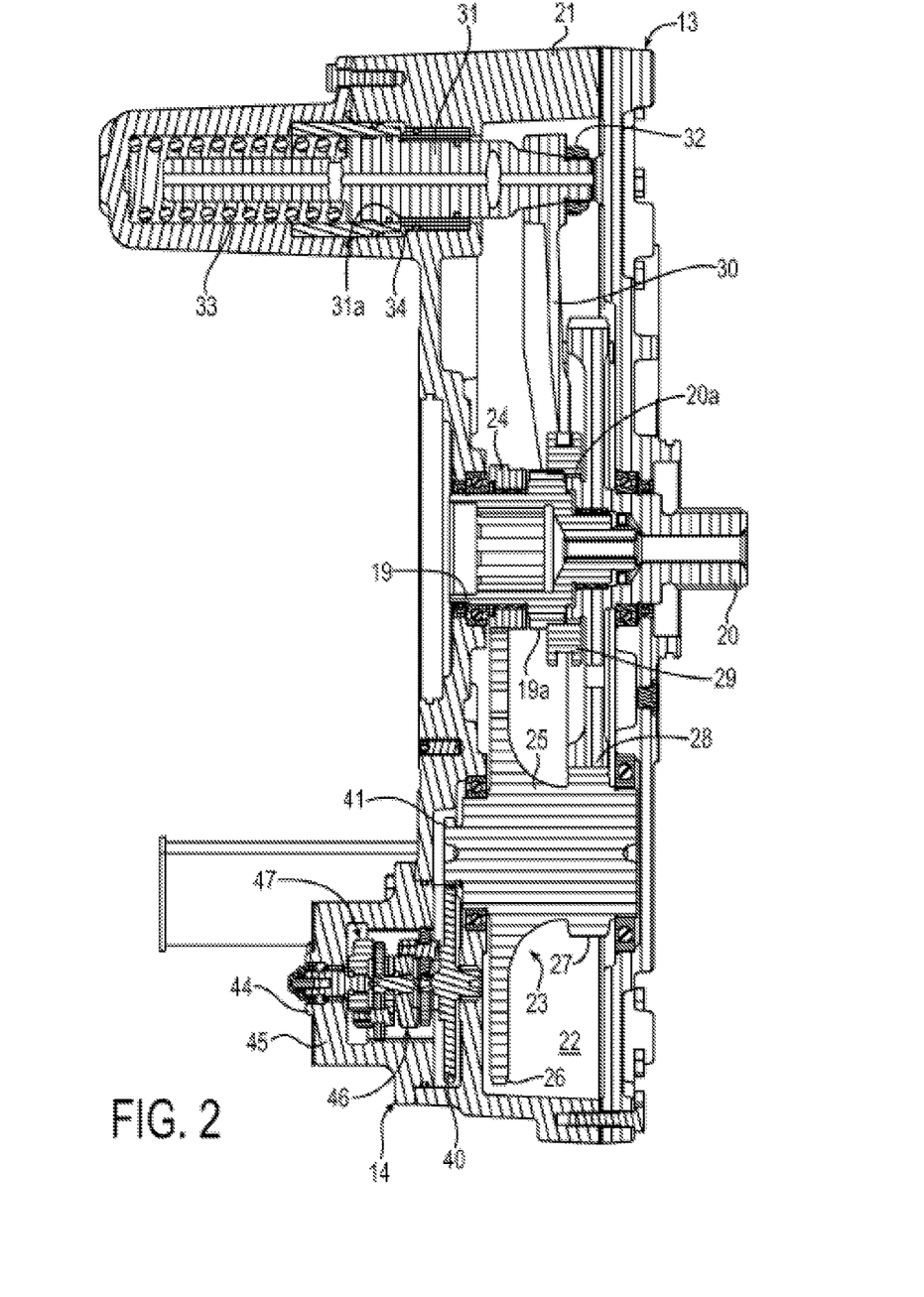
FIG. 2 is a longitudinal cross sectional view of the blow out preventer actuator and blow out preventer position indicator according to FIG. 1, showing the blow out preventer actuator in the first configuration.
Figure 3:
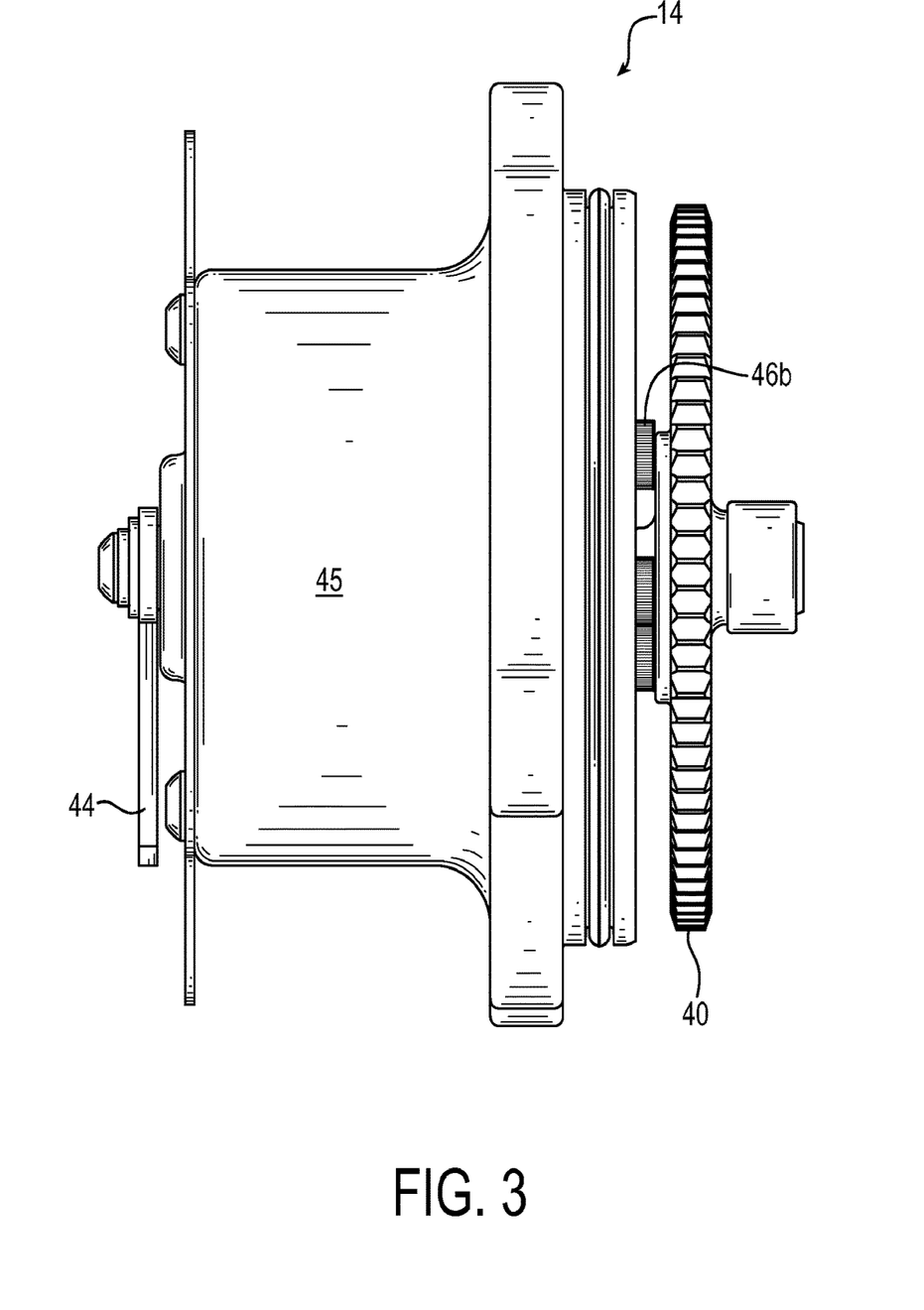
FIG. 3 is a side elevation view of the blow out preventer position indicator illustrated in FIGS. 1 and 2.
Figure 4:
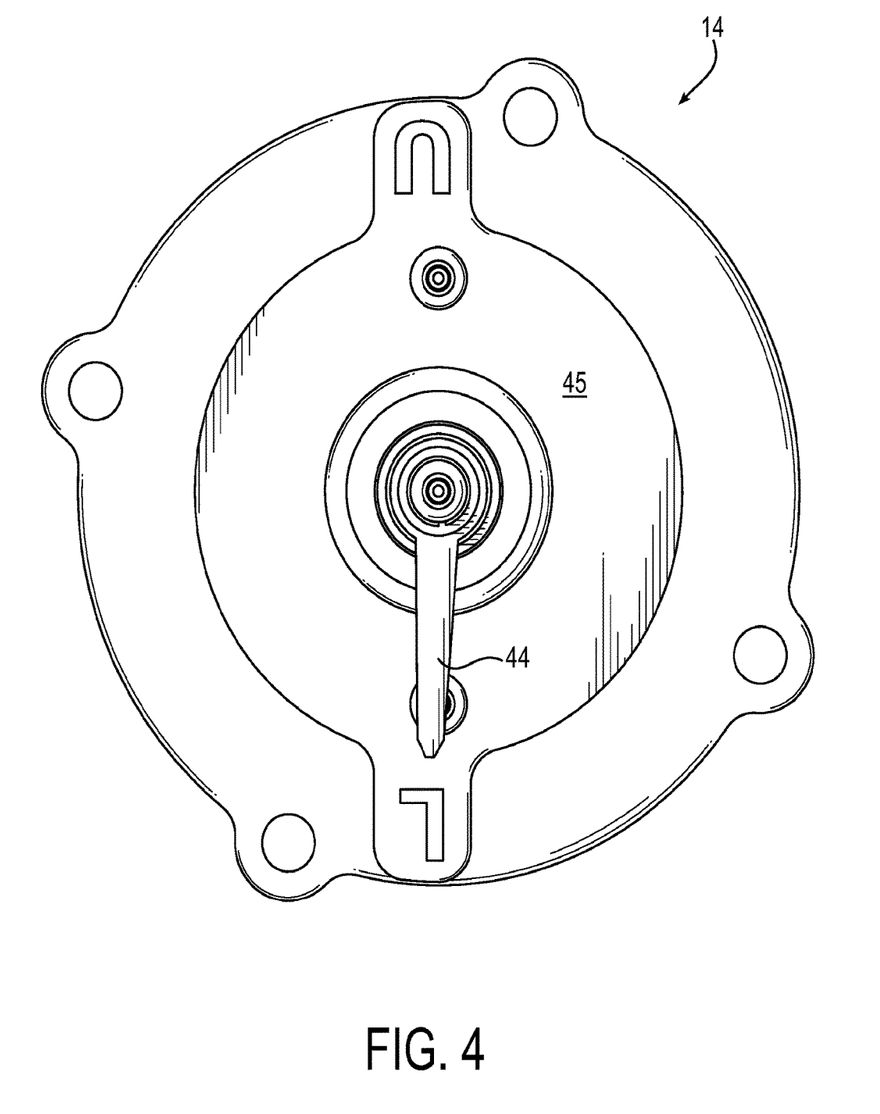
FIG. 4 is an end elevation view of the blow out preventer position indicator illustrated in FIGS. 1-3.
Figure 5:
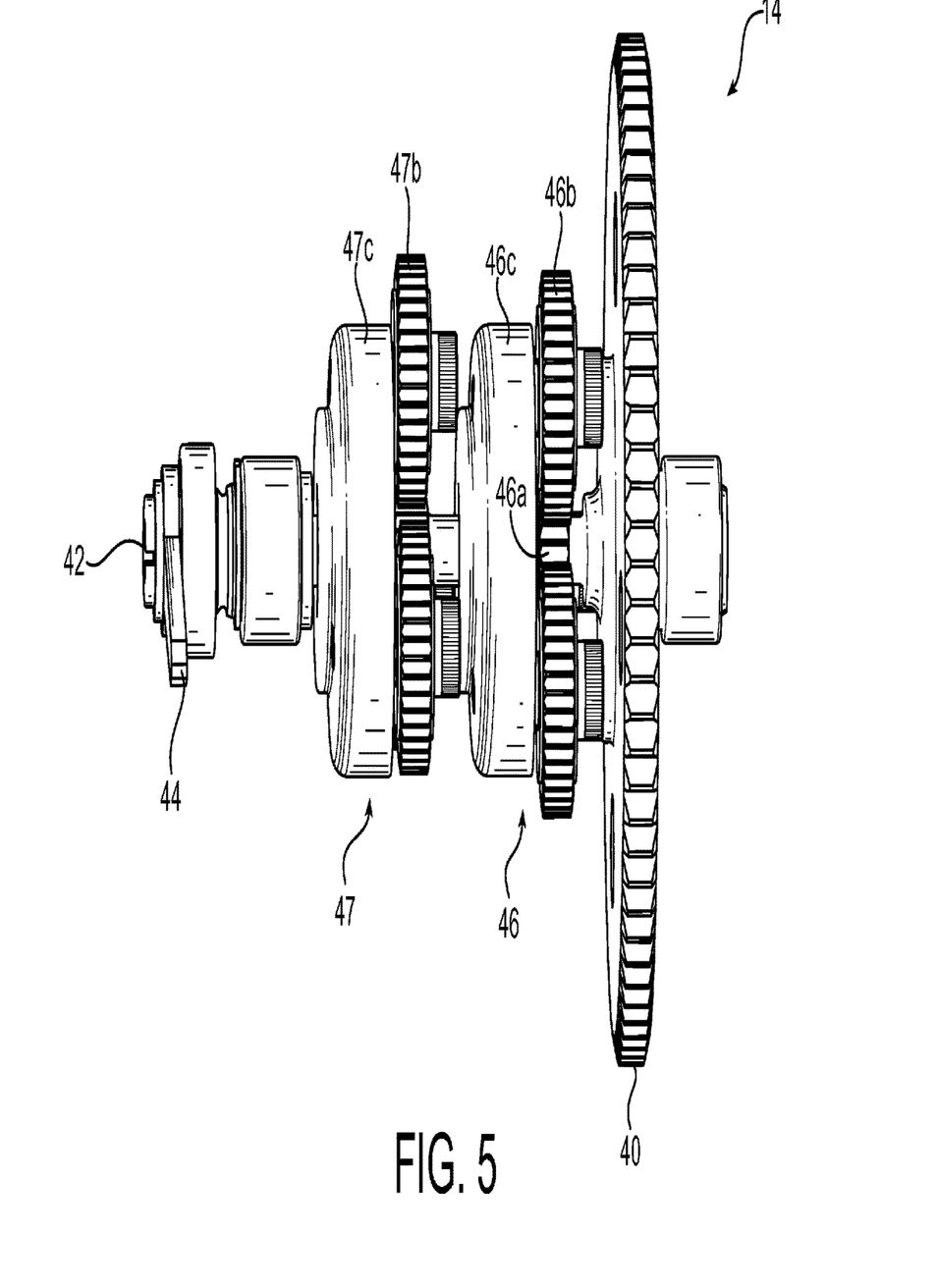
FIG. 5 is a side elevation view similar to FIG. 3, but with the housing of the blow out preventer position indicator removed.

Referring now to the drawings in greater detail, FIGS. 1-5 illustrate a first preferred embodiment of an actuator system and method 10 that includes a driven rotary device 11, a primary driver 12, a gear box 13 intermediate the primary driver 12 and the driven rotary device 11, and a position indicator 14. FIG. 1 illustrates the system 10 in schematic format, FIG. 2 illustrates the structure of the gear box 13 and position indicator 14, and FIGS. 3-5 illustrate the structure of the position indicator 14.

Turning first to FIGS. 1 and 2, the driven rotary device 11 in the preferred embodiment is a conventional well bore blow out preventer 11 used, for example, with subsea well bores. The blow out preventer 11 has an input 15, which, for example, is a rotary shaft in the preferred embodiment, and has an open position allowing the flow of fluid through the blow out preventer 11 and a closed position terminating such flow. The input 15 may drive the blow out preventer 11 between its open and closed positions or may drive a lock mechanism to drive the blow out preventer 11 between its locked and unlocked positions. The input 15 driven by gear box 13 may also drive the blow out preventer 11 between its locked and unlocked positions under normal conditions, and may provide a back up to open and close the blow out preventer under other conditions. The primary driver 12 in the preferred embodiment is a conventional bidirectional low speed high torque hydraulic motor such as, for example, a fixed displacement radial piston hydraulic motor 12. The hydraulic motor 12 may be connected with suitable a hydraulic line 16 to supply high pressure hydraulic fluid from a fluid pressure source 17 to the hydraulic motor 12, to rotate the hydraulic motor 12 in either direction. The fluid pressure source 17 may, for example, be a hydraulic pump or a hydraulic fluid accumulator. Conventional control valves (not shown) control the flow of hydraulic fluid to hydraulic motor 12 through hydraulic line 16. The hydraulic motor 12 has an output 18 connected to an input 19 of gear box 13, and gear box 13 has an output 20 connected to input 15 of blow out preventer 11. The hydraulic motor 12 and gear box 13 may be bolted together and joined to the blow out preventer 11. Also, multiple hydraulic motors 12 and gear boxes 13 may be mounted on the blow out preventer 11.

Referring still to FIGS. 1 and 2, the input 19 and output 20 of the gear box 13 are cylindrical shafts mounted with suitable bearings for rotating movement relative to a gear box housing 21. For axial length space saving purposes, the right end of input 19 is carried in a bearing in a bore in the left end of output 20. The bearing may include a single needle bearing as illustrated or alternatively may include two needle bearings or other suitable bearing arrangement. The central exterior surface of input 19 provides an external input drive gear or spline 19a, and the left exterior surface of output 20 provides an external output drive gear 20a as further described below. The housing 21 is sealed, and the interior of housing 21 provides a sealed enclosure 22 for a gear set 23 of gear box 13 that is intermediate the gear box input 19 and the gear box output 20. Gear set 23 includes a countershaft pinion or external countershaft drive gear 24 that is carried by a bearing on the exterior surface of input 19 to permit input 19 to rotate relative to countershaft pinion 24 when input 19 and countershaft pinion 24 are disengaged as further described below. Gear set 23 also includes an integral one piece countershaft assembly 25 that is carried by bearings in housing 21 and that includes a first countershaft gear or countershaft driven gear 26 that meshes with pinion 24 and a second countershaft gear or countershaft output drive gear 27 that meshes with an output gear 28 that is formed integrally with output 20.

A generally cylindrical shift collar 29 has an internal gear formed to engage the external input drive gear 19a formed on the exterior of the input 19 under all conditions and has an external annular groove extending around its entire exterior extent. Axial movement of the shift collar 29 is accomplished by a conventional shift fork 30, a portion of which is shown in FIG. 2. Shift fork 30, in a well known manner, has a generally U-shaped portion (not shown) at its lower end that fits into the annular groove of shift collar 29 so that shift fork 30 and shift collar 29 move together in the axial direction under all conditions. The top portion of shift fork 30 is secured to a tapered or cone shaped right end of control piston 31 and held in place by a nut 32 that is threaded onto the right end of control piston 31. A mechanical spring 33 acts between a suitable two piece cap of housing 21 and control piston 31 to bias control piston 31 to the right as viewed in FIG. 2 to a first configuration illustrated in FIGS. 1 and 2 and described further below. Alternatively, the cap of housing 21 that holds spring 33 may be a single piece. Control piston 31 includes an annular differential cross sectional area 31a exposed to a hydraulic fluid pressure command signal from command signal passage 34. The force created by the hydraulic fluid pressure command signal acting against the area 31a forces control piston 31 to the left against the bias of spring 33 to move control piston 31 and shift fork 30 and shift collar 29 to the left from the first configuration illustrated in FIGS. 1 and 2 to a second configuration described further below.

Referring still to FIGS. 1 and 2, gear set 23 has a high range gear ratio for transmitting a relatively higher speed and relatively lower torque from input 19 to output 20. The gear set 23 also has a low range gear ratio for transmitting a relatively lower speed and relatively higher torque from input 19 to output 20. Spring 33 biases gear set 23 to its high range gear ratio, in which the internal gear of shift collar 29 in the illustrated first configuration engages both the external gear 19a of input 19 and the external gear 20a of output 20. In this configuration, shift collar 29 provides a clutch mechanism to disengage the low range gear ratio and to engage the high range gear ratio in the illustrated first configuration. Input 19 and output 20 are connected directly together in the first configuration, to provide a direct or one-to-one gear ratio.

When a command signal is provided to command signal passage 34, such as for example from a sea surface platform when the system 10 is used on a subsea well bore, piston 31 moves to the left against the bias of spring 31 to a second configuration. In the second configuration, shift collar 29 provides a clutch mechanism to disengage the above described high range gear ratio and to engage the low range gear ratio. In this second configuration, shift collar 29 is moved axially to the left away from output gear 20a so that the internal gear of shift collar 29 engages and drivingly connects input gear 19a to countershaft pinion 24. In this second configuration, input gear 19a rotates countershaft pinion 24, countershaft pinion 24 rotates countershaft gear 26 and in turn gear 27, and gear 27 engages gear 28 to rotate output 20. Due to the sizes and gear teeth numbers on the described gears and illustrated in FIGS. 1 and 2, the engaged low range in the second configuration is substantially lower than the high range to substantially decrease the speed and substantially increase the torque transmitted from input 19 to output 20.

When the system and method 10 are used with a subsea well bore, the hydraulic motor 12 is provided with hydraulic fluid to rotate in one direction and the first or high range configuration may be used to rotate or move blow out preventer 11 valve from an open or unlocked or first position toward a closed position or locked or second position. The spring 31 biases the gear box to this high range configuration, so that when the blow out preventer 11 is open/unlocked, maximum speed is available to move it toward the closed/locked position. Further, the gearbox 13 can transfer sufficient levels of torque in this mode allowing an underwater rover (not shown) to manually rotate input 19, for example through the hydraulic motor 12, and open or close the blow out preventer 11 in case of emergency operating conditions. When the blow out preventer 11 is in a closed/locked position under normal operating conditions, a hydraulic fluid pressure command signal is provided to passage 34 to move piston 31 and fork 30 and shift collar 29 to the left as described above to engage the low range gear ratio and disengage the high range gear ratio. With the gear box 13 then maintained in the low range by the required command signal, hydraulic fluid from fluid pressure source 17 is simultaneously provided to hydraulic motor 12 to rotate hydraulic motor 12 in the opposite direction and maximum torque is available to move the blow out preventer from the closed/locked position toward the open/unlocked position. Once the blow out preventer begins this movement, the command signal may be terminated to allow spring 33 to move piston 31 and fork 30 and collar 29 back to the first configuration to complete movement toward the open/unlocked position at a faster rate and with less hydraulic fluid.

In operation of blow out preventer 11 under sea, it may be desirable to confirm the position of blow out preventer 11 after fluid has been supplied to hydraulic motor 11 to move blow out preventer 11 between its closed/locked position and its open/unlocked position. The position indicator 14 accomplishes this with an indicator whose position may be verified by a sensor or by a camera for use by operators at a surface platform location or elsewhere. While the blow out preventer 11 and its input shaft 15 and the gear box output 20 rotate multiple turns during movement between the closed/locked position and the open/unlocked position, sensing such multiple turns may introduce technical problems and complexity. Further, because the gear ratio between the hydraulic motor 12 and the blow out preventer 11 may change between a high range and a low range during operation, additional technical problems and complexity may be indicated in sensing position of the blow out preventer. The position indicator 14 addresses these technical problems.

As illustrated in FIGS. 1-5, position indicator 14 includes a position indicator input drive gear 40. Position indicator input drive gear 40 meshes with and is driven by a pinion gear 41, which is formed integrally on the left end of the countershaft assembly 25 and that rotates with countershaft gears 26 and 27. Countershaft assembly 25 drives output 20 and its integral gear 28 under all conditions, so that position indicator input drive gear 40 rotates whenever output 20 and blow out preventer input 15 rotate. Position indicator 14 further includes a position indicator output 42, a position indicator gear reducer 43, an indicator or arm 44 attached to and rotating with indicator output 42, and a housing 45. Gear reducer 43 includes a first position indicator planetary gear set 46 and a second position indicator planetary gear set 47, and gear sets 46 and 47 are in coaxial series arrangement. First planetary gear set 46 includes a sun gear 46a, planet gears 46b, planet carrier 46c, and stationary ring gear 46d. Secondary planetary gear set 47 includes a sun gear 47a, planet gears 47b, planet carrier 47c, and stationary ring gear 47d. Position indicator housing 45 encloses position indicator gear reducer 43 and is removably secured to gear box housing 21, so that position indicator 14 is removably secured to gear box 13. In this manner, system 10 may be provided with a position indicator 14 in the manner described and illustrated in FIGS. 1-5 or may be provided without a position indicator 14, in which case position indicator 14 may be replaced with a cover plate secured to housing 21. Also, position indicator 14 may be used in other applications with other driven rotary devices and/or gear boxes, in addition to the driven rotary device 11 and gear box 13 illustrated in system 10.

The interior cylindrical surface of position indicator housing 45 is formed with gear teeth, so that such interior surface provides both stationary ring gear 46d and stationary ring gear 47d, which in the illustrated embodiment are formed as adjacent portions of such interior surface. Sun gear 46a is driven by and rotates with position indicator input gear 40. The number of gear teeth on the components of first planetary gear set 46 in the preferred embodiment provides an X gear reduction ratio between the number of turns of sun gear 46a and the number of turns of planetary carrier 46c, where X is selected according to specific system requirements. Sun gear 47a is driven by and rotates with planetary carrier 46c, and the number of gear teeth on the components of second planetary gear set 47 in the preferred embodiment provides a Y gear reduction ratio between the number of turns of sun gear 47a and the number of turns of planetary carrier 47c, where Y is selected according to specific system requirements and may be the same or different than X. Position indicator output 42 is drivingly connected to planetary carrier 47c, so that Y turns of sun gear 47a would provide one turn of output 42. Because first and second planetary gear sets 46 and 47 are arranged in series with one another, the total gear reduction equals the gear reduction of first planetary gear set 46 multiplied times the gear reduction of second planetary gear set 47 for a total gear reduction ratio of XY. Position indicator input gear 40 is drivingly connected to the input 15 of the driven rotary device or blow out preventer 11 through gear box 13, and the XY ratio is selected in the illustrated example so that the number of turns of rotary driven device 11 from its first or open/unlocked position to its second or closed/locked position rotates output 42 and indicator 44 through one half turn or one hundred eighty degrees, so that indicator 44 points to the letter "U" (FIG. 4) indicating "Unlocked/Open" when the device 11 is in that position and rotates to point to the letter "L" indicating "Locked/Closed" when the device 11 is in that position. The specific gear ratios and numbers of turns may be selected to provide desired operation of the described components.

Figure 6:
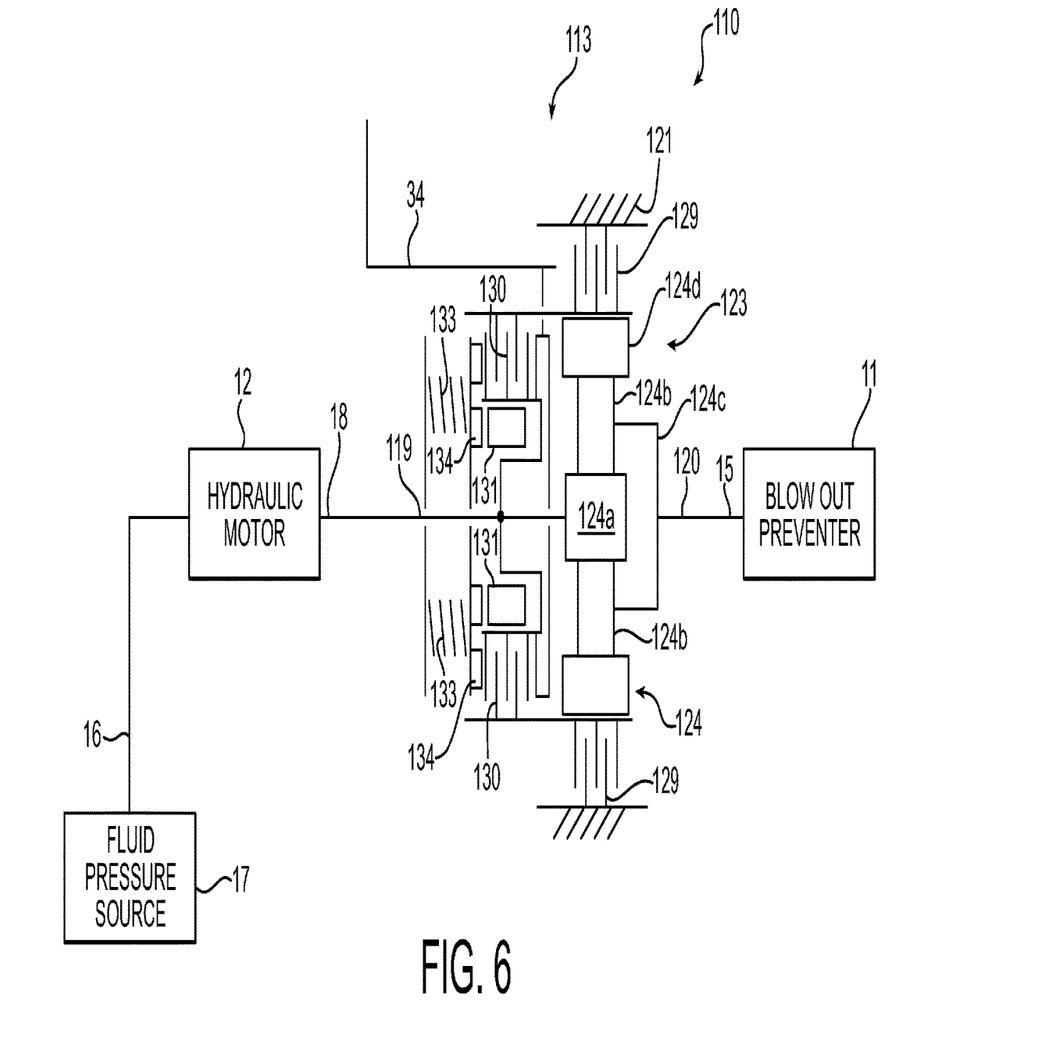
FIG. 6 is a schematic diagram of a system and method having a blow out preventer and blow out preventer actuator according to a second embodiment of the present invention, showing the blow out preventer actuator in a first configuration.

Turning now to FIG. 6, an alternate embodiment of the present invention provides an actuator system and method 110 that includes a driven rotary device or blow out preventer 11 having an input 15, a hydraulic motor 12 having an output 18, a fluid pressure source 17 with hydraulic line 16, and a hydraulic pressure command signal passage 34, all as more fully described above. A position indicator 14 as described above may optionally be included in system 110. The system 110 also includes a gear box 113 having an input 119 and an output 120. The gear box 113 includes a housing 121 that provides a sealed enclosure for a gear set 123. Gear set 123 includes a planetary gear set 124 having a sun gear 124a, planet gears 124b, a planet carrier 124c, and a ring gear 124d. Sun gear 124a is drivingly connected to input 119 under all conditions, and carrier 124c is drivingly connected to output 120 under all conditions. A first clutch 129 operates between ring gear 124d and housing 121. Clutch 129 has a first or default configuration in which it is released to disengage ring gear 124d from housing 121 to permit rotation of ring gear 124d, and clutch 129 has a second configuration in which clutch 129 is engaged to engage ring gear 124d to housing 121 to prevent rotation of ring gear 124d. A hydraulic fluid pressure command signal transmitted through command signal passage 34 moves clutch 129 to its engaged or second configuration. A second clutch 130 operates between ring gear 124d and input 119. Clutch 130 has a first configuration in which it is engaged to engage or drivingly connect ring gear 124d to input 119 so that input 119 drives ring gear 124d for rotation relative to housing 121, and clutch 130 has a second configuration in which clutch 130 is released to disengage ring gear 124d from input 119. Mechanical springs 133 bias clutch 130 to the described engaged configuration, and hydraulic pistons 131 operate against springs 133 to move clutch 130 to the described disengaged position when provided with a hydraulic fluid pressure command signal through command signal passage 34.

System 110 has a high range of operation in which higher speed and lower torque is transmitted from hydraulic motor 12 through gear box 113 to blow out preventer 11 and has a low range of operation in which lower speed and higher torque is transmitted from hydraulic motor 12 through gear box 113 to blow out preventer 11. System and method 110 operate according to the description above with respect to system and method 10 except as otherwise noted. System 110 is normally in its high range of operation, in the absence of a command signal in passage 34. In this configuration, hydraulic motor 12 drives sun gear 124a. Ring gear 124d is free to rotate, and springs 133 act against collar 134 to cause clutch 130 to be in its engaged configuration to lock ring gear 124d for driving connection to input 119. Because sun gear 124a and ring gear 124d both rotate with input 119 under this configuration, carrier 124c and output 120 rotate at the same speed as input 119 to provide a direct drive one-to-one high range gear ratio. When gear box 113 is to be shifted to low range, a pilot command signal in passage 34 operates to engage clutch 129 to lock ring gear 124d to housing 121. The command signal is also communicated to pistons 131, and pistons 131 act through collar 134 against springs 133 to disengage clutch 130 and disengage ring gear 124d from input 119. The high and low ranges then actuate blow out preventer 11 in the manner described above with respect to system 10.

Figure 7:
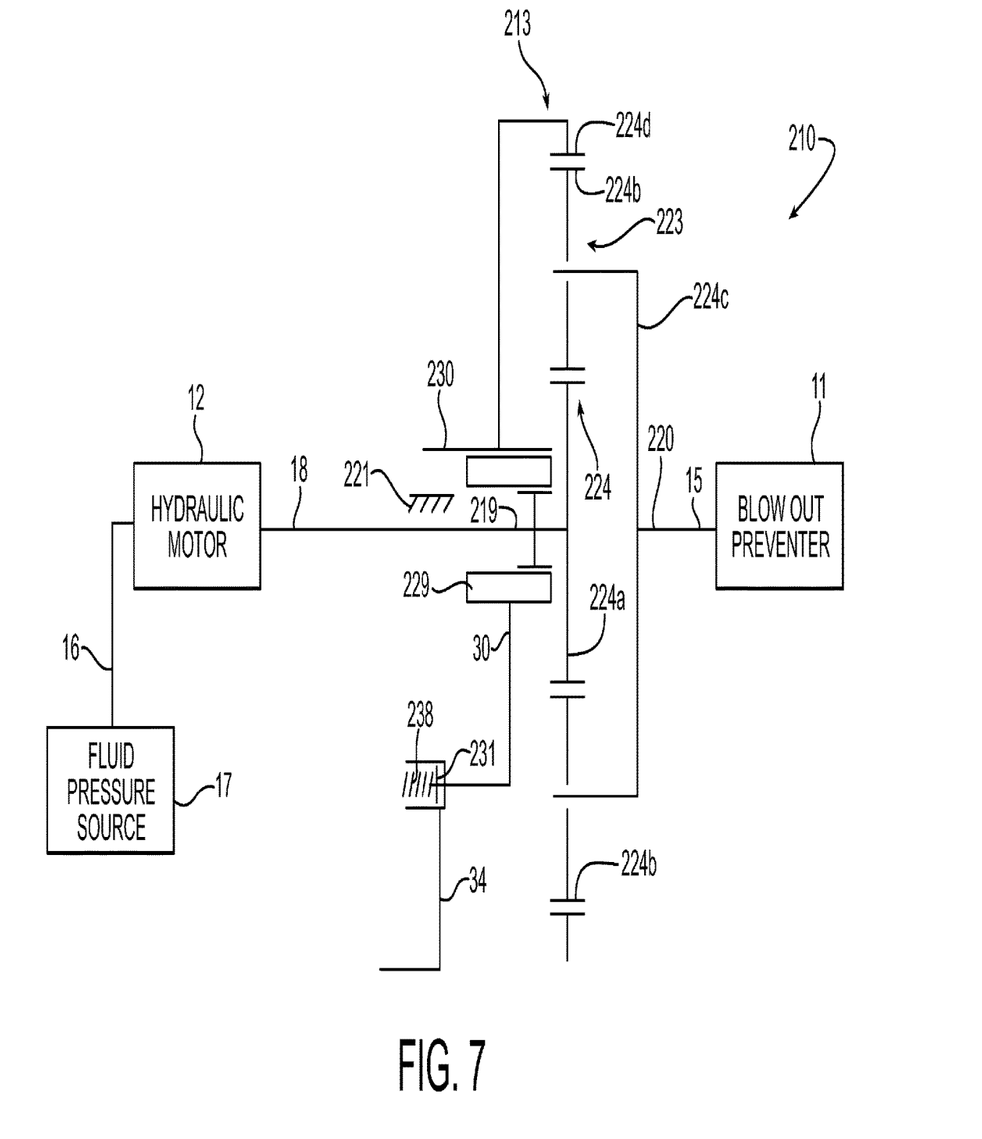
FIG. 7 is a schematic diagram of a system and method having a blow out preventer and blow out preventer actuator according to a third embodiment of the present invention, showing the blow out preventer actuator in a first configuration.

Turning now to FIG. 7, another alternate embodiment of the present invention provides an actuator system and method 210 that includes a driven rotary device or blow out preventer 11 having an input 15, a hydraulic motor 12 having an output 18, a fluid pressure source 17 with hydraulic line 16, and a hydraulic pressure command signal passage 34, all as more fully described above. A position indicator 14 as described above may optionally be included in system 210. The system 210 also includes a gear box 213 having an input 219 and an output 220. The gear box 213 includes a housing 221 that provides a sealed enclosure for a gear set 223. Gear set 223 includes a planetary gear set 224 having a sun gear 224a, planet gears 224b, a planet carrier 224c, and a ring gear 224d. Sun gear 224a is drivingly connected to input 219 under all conditions, and carrier 224c is drivingly connected to output 220 under all conditions. A drive gear 230 is drivingly connected to ring gear 224d under all conditions. A dog clutch 229 operates between ring gear 224d (through drive gear 230) and housing 221 and between ring gear 224d and input 219. Clutch 229 has a first or default configuration illustrated in FIG. 7, in which clutch 229 releases ring gear 224d from housing 221 and engages ring gear 224d to input 219. Clutch 229 also has a second configuration in which clutch 229 is moved to the right from its first configuration viewed in FIG. 7 to release ring gear 224d from input 219 and to engage ring gear 224d to housing 221 to prevent rotation of ring gear 224d. A hydraulic fluid pressure command signal transmitted through command signal passage 34 moves clutch 229 to its engaged or second configuration. Mechanical spring 238 biases clutch 229 to the described first configuration, and hydraulic piston 231 operate against spring 238 to move clutch 229 to the described second position when provided with a hydraulic fluid pressure command signal through command signal passage 34

System 210 has a high range of operation in which higher speed and lower torque is transmitted from hydraulic motor 12 through gear box 213 to blow out preventer 11, and has a low range of operation in which lower speed and higher torque is transmitted from hydraulic motor 12 through gear box 213 to blow out preventer 11. System and method 210 operate according to the description above with respect to system and method 110 except as otherwise noted. System 210 is normally in its high range of operation, in the absence of a command signal in passage 34. In this configuration, hydraulic motor 12 drives sun gear 224a. Spring 238 acts to cause dog clutch 229 to be in its first or engaged configuration illustrated in FIG. 7 to lock ring gear 224d for driving connection to input 219. Because sun gear 224a and ring gear 224d both rotate with input 219 under this configuration, carrier 224c and output 220 rotate at the same speed as input 219 to provide a direct drive one-to-one high range gear ratio. When gear box 213 is to be shifted to low range, a pilot command signal in passage 34 operates to move clutch 229 to the left as viewed in FIG. 7 to lock ring gear 224d to housing 221. The high and low ranges then actuate blow out preventer 11 in the manner described above with respect to system 10.

While presently preferred embodiments of the invention are shown and described in detail above, the invention is not limited to these specific embodiments. For example, other gear arrangements may be provided and other devices for shifting gears may be provided. Various changes and modifications can be made to this invention without departing from its teachings, and the scope of this invention is defined by the claims set out below.

The invention claimed is:

1. An actuator system comprising:
   a driven rotary device;
   a primary driver; and
   a gear box intermediate the primary driver and the driven rotary device,
   the driven rotary device having a driven rotary device input, the primary driver having a primary driver output,
   the gear box having a gear box input connected to the primary driver output and having a gear box output connected to the driven rotary device input, the gear box having a gear set intermediate the gear box input and the gear box output, the gear set having a high range gear ratio for transmitting a relatively higher speed and relatively lower torque from the gear box input to the gear box output, the gear set having a low range gear ratio substantially lower than the high range gear ratio for transmitting a relatively lower speed and relatively higher torque from the gear box input to the gear box output,
   a shift mechanism having a first configuration engaging the high range gear ratio and disengaging the low range gear ratio, the shift mechanism having a second configuration engaging the low range gear ratio and disengaging the high range gear ratio, the shift mechanism being biased to the first configuration as a default position, and the shift mechanism moving from the first configuration to the second configuration in response to a command signal, and further including any one of the following additional structures:
   (1) (a) the gear set includes a countershaft assembly, the shift mechanism includes a clutch, and the clutch disengages the countershaft assembly in the first configuration and engages the countershaft assembly in the second configuration, (b) the gear box input includes an external input drive gear, the gear box output includes an external output drive gear, and the clutch includes an internal gear, the internal gear engages the external input drive gear in both the first and second configurations, the internal gear engages the external output drive gear in the first configuration, and the internal gear disengages the external output drive gear in the second configuration, and (c) including an external countershaft drive gear that drivingly engages the countershaft assembly under all conditions, and the internal gear engages the external countershaft drive gear in the second configuration and disengages the external countershaft drive gear in the first configuration; or
   (2) the gear set includes a planetary gear set having a sun gear, a planet gear, a planet gear carrier, and a ring gear, the shift mechanism includes a clutch, the clutch drivingly engages the ring gear to the gear box input when the shift mechanism is in the first configuration and drivingly disengages the ring gear from the gear box input when the shift mechanism is in the second configuration; or
   (3) the actuator system includes a position indicator, the position indicator including an indicator input, an indicator output, an indicator gear reducer, an indicator attached to the indicator output, and the indicator input being drivingly connected to the driven rotary device input; or (4) the driven rotary device is a well bore blow out preventer; or (5) the primary driver is a bi-directional hydraulic motor, whereby the gear box input is rotated multiple rotations in either direction.

2. The actuator system set forth in claim 1, including a mechanical spring biasing the shift mechanism to the first configuration as a default position.

3. The actuator system set forth in claim 2, wherein the shift mechanism includes a hydraulic piston to move the shift mechanism against the bias of the spring from the first configuration to the second configuration, and the hydraulic piston is actuated by a pilot hydraulic command signal from outside the gear box.

4. The actuator system set forth in claim 1, wherein (a) the additional structure is the gear set that includes a countershaft assembly, the shift mechanism includes a clutch, and the clutch disengages the countershaft assembly in the first configuration and engages the countershaft assembly in the second configuration and wherein (b) the gear box input includes an external input drive gear, the gear box output includes an external output drive gear, and the clutch includes an internal gear, the internal gear engages the external input drive gear in both the first and second configurations, the internal gear engages the external output drive gear in the first configuration, and the internal gear disengages the external output drive gear in the second configuration, and (c) further including an external countershaft drive gear that drivingly engages the countershaft assembly under all conditions, and the internal gear engages the external countershaft drive gear in the second configuration and disengages the external countershaft drive gear in the first configuration.

5. The actuator system set forth in claim 4, wherein the external input drive gear is intermediate the external output drive gear and the countershaft drive gear, the countershaft drive gear is rotatably carried on the gear box input, and the countershaft assembly includes a first countershaft gear drivingly engaging the countershaft drive gear under all conditions and a second countershaft drive gear drivingly engaging the output under all conditions.

6. The actuator system set forth in claim 4, including a position indicator, the position indicator including an indicator input, an indicator output, an indicator gear reducer, an indicator attached to the indicator output, and the indicator input is driving connected to the countershaft assembly.

7. The actuator system set forth in claim 1, wherein the additional structure is the gear set that includes a planetary gear set having a sun gear, a planet gear, a planet gear carrier, and a ring gear, the shift mechanism includes a clutch, the clutch drivingly engages the ring gear to the gear box input when the shift mechanism is in the first configuration and drivingly disengages the ring gear from the gear box input when the shift mechanism is in the second configuration.

8. The actuator system set forth in claim 1, wherein the additional structure is a position indicator, the position indicator including an indicator input, an indicator output, an indicator gear reducer, an indicator attached to the indicator output, and the indicator input being drivingly connected to the driven rotary device input.

9. The actuator system set forth in claim 8, wherein the indicator input is driving connected to the driven rotary device input through the gear box gear set.

10. The actuator system set forth in claim 8, wherein the indicator gear reducer includes first and second planetary gear sets in series, each of the planetary gear sets includes a sun gear, a planet gear, a planet gear carrier, and a ring gear.

11. The actuator system set forth in claim 10, wherein the sun gears of the position indicator planetary gear sets are coaxial, the indicator input is connected to the sun gear of the first planetary gear set, the planet carrier of the first planetary gear set is connected to the sun gear of the second planetary gear set, the indicator output is connected to the second planetary gear set planet carrier, and the ring gears of each planetary gear set are stationary.

12. The actuator system set forth in claim 8 wherein the indicator gear reducer is between the indicator input and the indicator output.

13. The actuator system set forth in claim 12, wherein the indicator gear reducer includes first and second planetary gear sets in series, each of the planetary gear sets includes a sun gear, a planet gear, a planet gear carrier, and a ring gear.

14. The actuator system set forth in claim 13, wherein the sun gears of the planetary gear sets are coaxial, the indicator input is connected to the sun gear of the first planetary gear set, the planet carrier of the first planetary gear set is connected to the sun gear of the second planetary gear set, the indicator output is connected to the second planetary gear set planet carrier, and the ring gears of each planetary gear set are stationary.

15. The actuator system set forth in claim 1, wherein the additional structure is that the driven rotary device is a well bore blow out preventer.

16. The actuator system set forth in claim 15, wherein the blow out preventer has a first position and a second position, the gear set is in the high range gear ratio when the blow out preventer is being rotated from its first position to its second position, and the gear set is in the low range gear ratio when the blow out preventer is initially being rotated from its second position to its first position.

17. The actuator system set forth in claim 1, wherein the additional structure is that the primary driver is a bi-directional hydraulic motor, whereby the gear box input is rotated multiple rotations in either direction.

18. The actuator system set forth in claim 1, wherein the high range gear ratio is one-to-one between a gear box input and a gear box output.

19. A method of rotating a well bore blow out preventer input between a first position and a second position comprising the steps of:
connecting a primary driver through a gear box to the blow out preventer input,
biasing the gear box to a high range default gear ratio and rotating the primary driver in one direction multiple turns to rotate the blow out preventer input from its first position toward its second position,
communicating a command signal to the gear box to shift the gear box from its high range default gear ratio to a lower gear ratio, and simultaneously maintaining the gear box in its lower gear ratio and rotating the primary driver in an opposite direction to rotate the blow out preventer input from its second position toward its first position.

20. The method set forth in claim 19, wherein the biasing is by a mechanical spring, the command signal is a hydraulic fluid pressure signal, and the command signal is maintained and required to maintain the gear box in its low range gear ratio.

21. The method set forth in claim 19, wherein the method mechanically locks and unlocks the blow out preventer, the second position is a locked position for the blow out preventer, and the first position is an unlocked position for the blow out preventer.

22. The method set forth in claim 21, wherein the method provides a mechanical back up to open and close the blow out preventer, the second position is a closed position for the blow out preventer, and the first position is an open position for the blow out preventer.

\* \* \* \* \*